(12) United States Patent
Ulichney et al.

(10) Patent No.: US 10,521,931 B2
(45) Date of Patent: Dec. 31, 2019

(54) DETERMINE IMAGE CAPTURE POSITION INFORMATION BASED ON A QUASI-PERIODIC PATTERN

(71) Applicant: Hewlett-Packard Development Company, L.P., Houston, TX (US)

(72) Inventors: Robert Ulichney, Stow, MA (US); Matthew D Gaubatz, Seattle, WA (US); Stephen Pollard, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 15/522,749

(22) PCT Filed: Dec. 19, 2014

(86) PCT No.: PCT/US2014/071347
§ 371 (c)(1),
(2) Date: Apr. 27, 2017

(87) PCT Pub. No.: WO2016/099527
PCT Pub. Date: Jun. 23, 2016

(65) Prior Publication Data
US 2017/0330350 A1    Nov. 16, 2017

(51) Int. Cl.
*G06T 7/00* (2017.01)
*G06T 7/11* (2017.01)
*G06T 1/00* (2006.01)
*G06F 16/583* (2019.01)
*H04N 5/232* (2006.01)

(52) U.S. Cl.
CPC .......... *G06T 7/97* (2017.01); *G06F 16/5854* (2019.01); *G06T 1/0007* (2013.01); *G06T 7/11* (2017.01); *H04N 5/23216* (2013.01); *H04N 5/23293* (2013.01)

(58) Field of Classification Search
None
See application file for complete search history.

(56) References Cited

U.S. PATENT DOCUMENTS 5,949,055 A    9/1999    Fleet et al.
6,535,618 B1   3/2003    Rhoads
(Continued)

FOREIGN PATENT DOCUMENTS

CN    1806255    7/2006
CN    1971590    5/2007
(Continued)

OTHER PUBLICATIONS

Kim, Kyungnam, et al. "Real-time foreground-background segmentation using codebook nnodel."Real-time imaging 11.3 (2005): 172-185. (Year: 2005).*
(Continued)

*Primary Examiner* — Michelle M Entezari
(74) *Attorney, Agent, or Firm* — HP Inc. Patent Department

(57) ABSTRACT

Examples disclosed herein relate to determining image capture position information based on a quasi-periodic pattern. For example, a processor may determine whether a target area is within a captured image based on the detection of a quasi-periodic pattern in a first detection area and in a second detection area of the captured image.

20 Claims, 5 Drawing Sheets

(56) References Cited

U.S. PATENT DOCUMENTS

| | | | |
|---|---|---|---|
| 6,741,279 B1 | 5/2004 | Allen | |
| 7,013,021 B2 * | 3/2006 | Sharma | G06T 1/0071 |
| | | | 382/100 |
| 7,260,099 B1 * | 8/2007 | Brown | H04J 3/076 |
| | | | 370/395.51 |
| 8,184,155 B2 * | 5/2012 | Ke | G06K 9/00463 |
| | | | 348/142 |
| 8,379,914 B2 | 2/2013 | Nepomniachtchi | |
| 2004/0202355 A1 * | 10/2004 | Hillhouse | G06K 9/00087 |
| | | | 382/124 |
| 2006/0086797 A1 | 4/2006 | Saito et al. | |
| 2007/0005977 A1 * | 1/2007 | Tohne | H04N 1/32203 |
| | | | 713/176 |
| 2007/0285537 A1 * | 12/2007 | Dwinell | G06T 7/001 |
| | | | 348/263 |
| 2008/0273741 A1 * | 11/2008 | Fujii | G06T 1/0028 |
| | | | 382/100 |
| 2010/0118123 A1 * | 5/2010 | Freedman | G06K 9/2036 |
| | | | 348/46 |
| 2013/0044948 A1 * | 2/2013 | Gaubatz | H04N 1/32256 |
| | | | 382/166 |
| 2013/0339261 A1 | 12/2013 | Oda | |
| 2014/0063320 A1 | 3/2014 | Lin et al. | |
| 2014/0168468 A1 | 6/2014 | Levoy et al. | |
| 2014/0347552 A1 | 11/2014 | Levoy et al. | |
| 2016/0063300 A1 * | 3/2016 | Du | G06K 9/00033 |
| | | | 382/124 |
| 2017/0132800 A1 * | 5/2017 | Ulichney | G06T 7/42 |
| 2017/0206671 A1 * | 7/2017 | Pollard | G06T 7/37 |

FOREIGN PATENT DOCUMENTS

| | | | | |
|---|---|---|---|---|
| CN | 103685909 | | 3/2014 | |
| EP | 1128655 | | 8/2001 | |
| JP | 2001-326837 A | | 11/2001 | |
| WO | WO-2011163378 A1 | | 12/2011 | |
| WO | WO-2014060025 A1 | | 4/2014 | |
| WO | WO-2014094815 A1 * | | 6/2014 | G06K 9/525 |

OTHER PUBLICATIONS

Machine Translation WO2014094815A1 (Year: 2014).*
Allebach, J. P., and B. Liu. "Random quasiperiodic halftone process." JOSA 66, No. 9 (1976): 909-917. (Year: 1976).*
Jiang, M et al, Steganalysis of Boundary-based Stenganography Using Autoregressive Model of Digital Boundaries, Mar. 31, 2004.

* cited by examiner

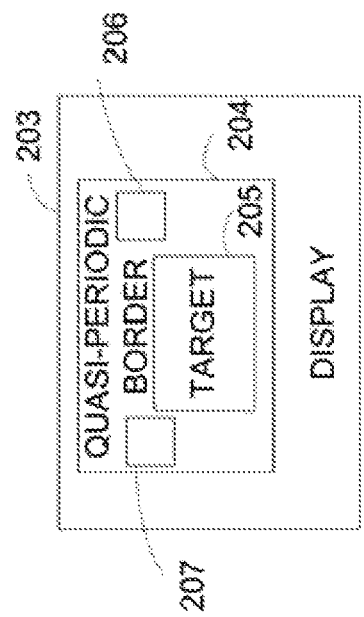
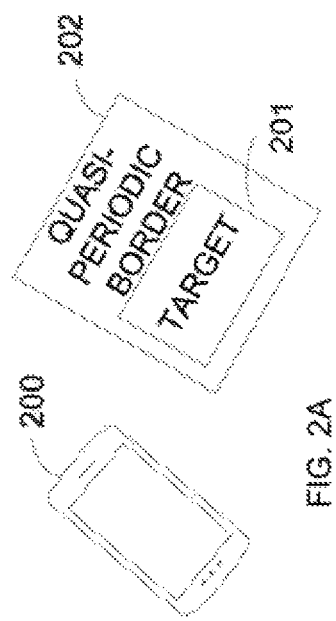

DETERMINE IMAGE CAPTURE POSITION INFORMATION BASED ON A QUASI-PERIODIC PATTERN

BACKGROUND

A mobile application may allow a user to capture an image, such as a photo or video image. The image capture application may provide the user with information about the image as it is being captured. For example, a user interface may display squares or other markings representing the focus areas of the image.

BRIEF DESCRIPTION OF THE DRAWINGS

The drawings describe example embodiments. The following detailed description references the drawings, wherein:

FIGS. 2A and 2B are diagrams, illustrating examples of capturing an image with a quasi-periodic pattern.

DETAILED DESCRIPTION

Figure 1:
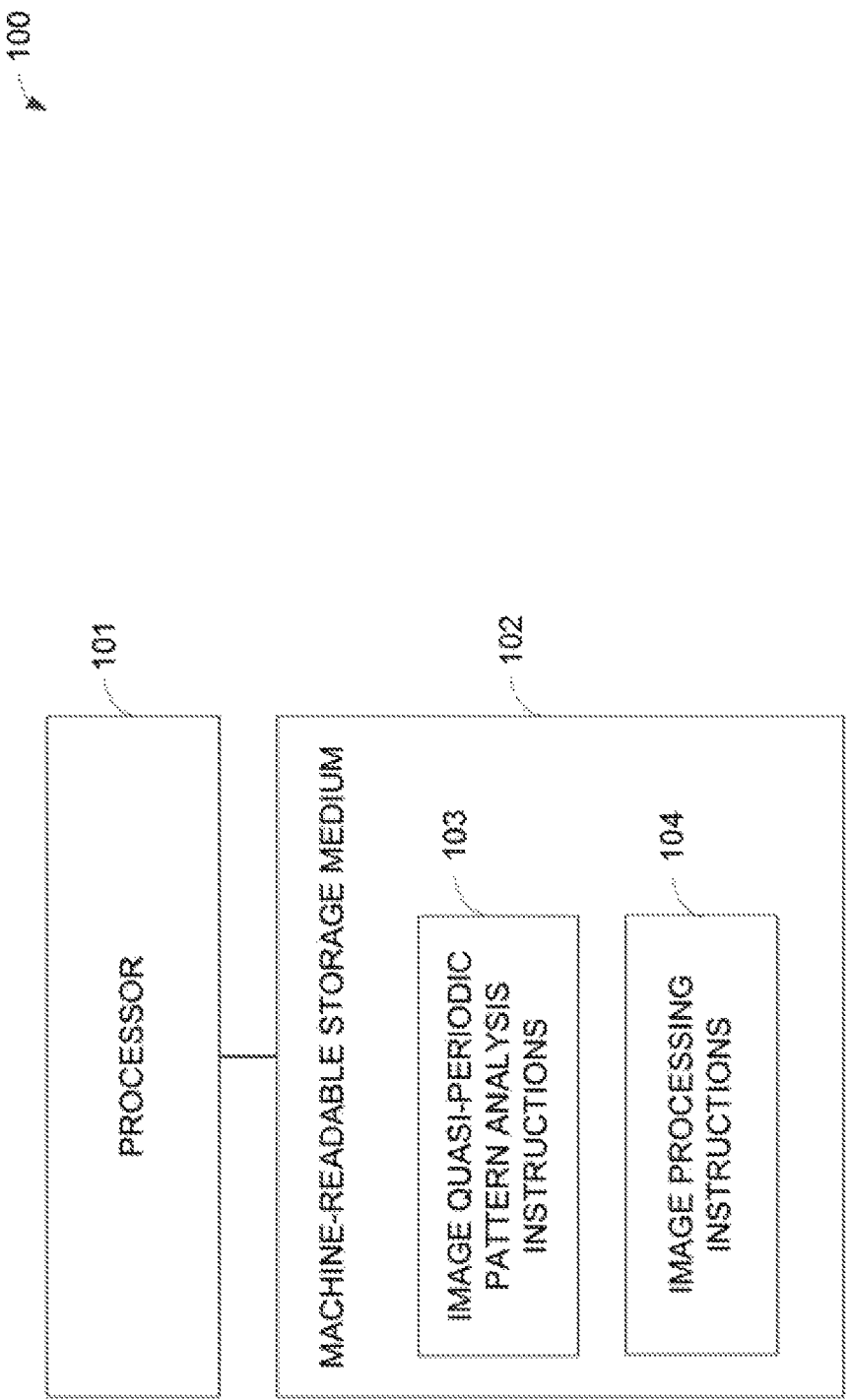
FIG. 1 is a block diagram illustrating one example of a computing system to determine image capture position information based on a quasi-periodic pattern.

In one implementation, a processor analyzes a captured image to detect a quasi-periodic reference pattern to determine if the position of an object in a captured image meets criteria for processing a target portion of the image. For example, a printed or digital object may be created with a quasi-periodic pattern as a border surrounding a target portion of the object to corral or otherwise provide a reference for the location of the target portion. In one implementation, an image is taken of an object with a printed quasi-periodic pattern placed in a disposed location relative to the object. A processor may determine whether a quasi-periodic pattern is detected in particular detection areas of a captured image to determine if the target area is positioned within the captured image. For example, the presence of the quasi-periodic pattern may be used to determine that the target area is not cropped or a sufficient area of the target area is within the image. If a quasi-periodic pattern is detected in a captured image, information about the angle and scale of the pattern may be used to determine the orientation of the image capture, whether the image capture is too oblique, and whether the image capture distance is within an acceptable range. In one implementation, a user interface is generated to provide user feedback related to whether a captured image may be processed and/or how to improve the image capture to allow the image to be processed.

The quasi-periodic pattern border may be used to surround a target area of the image such that the target area is between multiple portions of the border, such as where the quasi-periodic pattern border is used to corral the target area. The border may be directly adjacent to the target area or provide some space between the target area and the border. The border may confine the target area while not completely bordering or surrounding the target area. Using a quasi-periodic pattern border may allow for an aesthetically pleasing manner of providing image capture position information. For example, the border may be small or decorative without drawing excessive attention to itself as an image capture guide. The border may be in multiple types of shapes depending on the shape of the target area. A quasi-periodic border may allow for multiple acceptable capture positions, such as in a horizontal or vertical orientation and with multiple areas of the border that may be in a detection area. Detecting the quasi-periodic pattern in multiple detection areas may confirm that the target image is within the captured image without or with limited cropping and within acceptable orientation and resolution ranges.

The quasi-periodic pattern may be a halftone pattern created based on the positioning of small black and white dots appearing as an aesthetically pleasing gray border. In one implementation, there is a payload associated with the quasi-periodic pattern, such as with a steganographic halftone where the clustered halftone dots are shifted dots individually representative of payload data.

As an example, a user may capture a video image with a mobile device, and a user interface may be provide on the mobile device to highlight two detection areas. The user may attempt to place the two detection areas in a manner that causes them to overlay the border pattern on the subject of the video capture. A processor may determine whether the video image is suitable based on a detection of a quasi-periodic pattern within the detection areas. The processor may further determine additional aspects about the video capture based on the properties of the detected patterns. If the processor determines that the video capture is sufficient, the processor may store the video frame. The stored video frame may be used during processing of the target area of the image within the quasi-periodic pattern border. As another example, a high resolution image may be captured when the position criteria is met.

FIG. 1 is block diagram illustrating one example of a computing system 100 to determine image capture information based on a quasi-periodic pattern. For example, the computing system 100 may determine if a quasi-periodic pattern is present within a first and second detection area of an image. The presence of the quasi-periodic pattern in the two detection areas may indicate that a target area is captured within the image. For example, the quasi-periodic pattern may provide a reference point and/or border to a target area. Further analysis may be performed on the portions of the quasi-periodic pattern within and outside of the detection areas to determine additional information about the image capture, such as orientation. The computing system 100 includes a processor 101 and a machine-readable storage medium 102. The computing system 100 may include a device to capture an image, such as a mobile device or other device capable of still image and/or video capture. The mobile device may transmit the image to the processor 101 via a network, such as the Internet.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include image quasi-periodic pattern analysis instructions 103 and image processing instructions 104.

The image quasi-periodic pattern analysis instructions 103 includes instructions to detect and analyze a quasi-periodic pattern within an image. Detection areas may be positioned such that if the quasi-periodic pattern is within the detection areas, the target area is between the detection areas within the image capture without or with acceptable cropping of the target area. There may be any suitable number of detection areas of any suitable shapes and sizes. In one implementation, there are multiple potential detection areas, and the processor determines that the image capture is sufficient if a quasi-periodic pattern is detected within a subset of the detection areas. The detection areas may be positioned based on the size of the image such that they are in the same position regardless of the orientation or other capture differences. The portion of the image within a first detection area may be analyzed to determine whether it includes a quasi-periodic pattern. Any suitable method may be used to determine whether a quasi-periodic pattern is present, such as a method of analyzing the image in the image domain or frequency domain. For example, a DFT may be created from the portion of the image within the detection area. The processor 101 or another processor may analyze the DFT for peak frequencies. In some cases, a quasi-periodic pattern may be detected where less than the entire detection area displays a quasi-periodic pattern, such as where 50% of the detection area includes a quasi-periodic pattern.

The image processing instructions 104 includes instructions to process the captured image if the quasi-periodic pattern is detected within the two detection areas. The processor may store the image for processing or transmit the image for processing. The image processing may involve performing a service associated with the target area of the image. For example, processor may perform alignment methods to extract the target area of the image from the image based on the presence of the quasi-periodic patterns and properties of quasi-periodic pattern. In one implementation, the processor decodes a payload associated with the quasi-periodic pattern. The target area may be used as part of a mobile application, such as to provide information about an object in the target area of the image or provide a recommendation related to an object in the target area of the image.

FIGS. 2A and 2B are diagrams illustrating one example of capturing an image with a quasi-periodic pattern. For example, FIG. 2A shows mobile device 200 captures an image of an object including a target 201 and a quasi-periodic pattern border 202 surrounding the target 201. The target 201 may be a two-dimensional object including the pattern, such as a paper with a target portion and an attached surrounding frame, a hollow portion surrounded by a quasi-periodic frame that a user places over an object of interest, or a combination of the two. There may be any suitable number of objects and number of quasi-periodic borders, such as where there is an inner target and outer target separated by a quasi-periodic pattern.

The quasi-periodic pattern border 202 may surround the target 201 in any suitable manner. For example, the quasi-periodic pattern border 202 may be a continuous border, or may include gaps. In one implementation, the quasi-periodic pattern border 202 surrounds the target 201 on two sides, leaving other edges of the target 201 without the border. The quasi-periodic border may be adjacent to the target 201 or include additional space. For example, where a farther capture distance is desirable, there may be more space between the target 201 and the quasi-periodic pattern border 202. The mobile device 200 may capture a photograph and/or video of the object.

FIG. 2B shows the display 203 of the mobile device 200. For example, the display 203 may show an item as it is being captured in a video or still image. The display 203 shows a quasi-periodic pattern 204, corresponding to the quasi-periodic pattern border 202, and a target 205, corresponding to the target 201. The display 203 shows detection areas 206 and 207 for detecting a quasi-periodic pattern. The detection areas 206 and 207 may be shown on a user interface as displayed on the mobile device 200 overlaying the image. There may be any number of detection areas in any suitable positions. The detection areas may be overlapping or contained within one another. The subset of detection areas may be determined based on detecting a quasi-periodic pattern in a first detection area, such as where a third detection area associated with a quasi-periodic pattern present in a first detection area, and a fourth detection area is associated with a quasi-periodic pattern present in a second detection area. In one implementation, a subset of the possible detection areas are displayed on the user interface. For example, there may be an inner and outer shape of detection areas in order to be able to detect the border at different resolutions, and the inner or outer shape of detection areas may be activated based on detecting a first quasi-periodic pattern in a first detection area in either the inner or outer shape. In one implementation, the user interface displays the detection area differently if a quasi-periodic pattern is detected in order to provide user feedback as to which areas of the image should be moved to be in a detection area. For example, detection areas with a quasi-periodic pattern detected may appear with a green outline, and detection areas without a quasi-periodic pattern may appear with a red outline.

Figure 3:
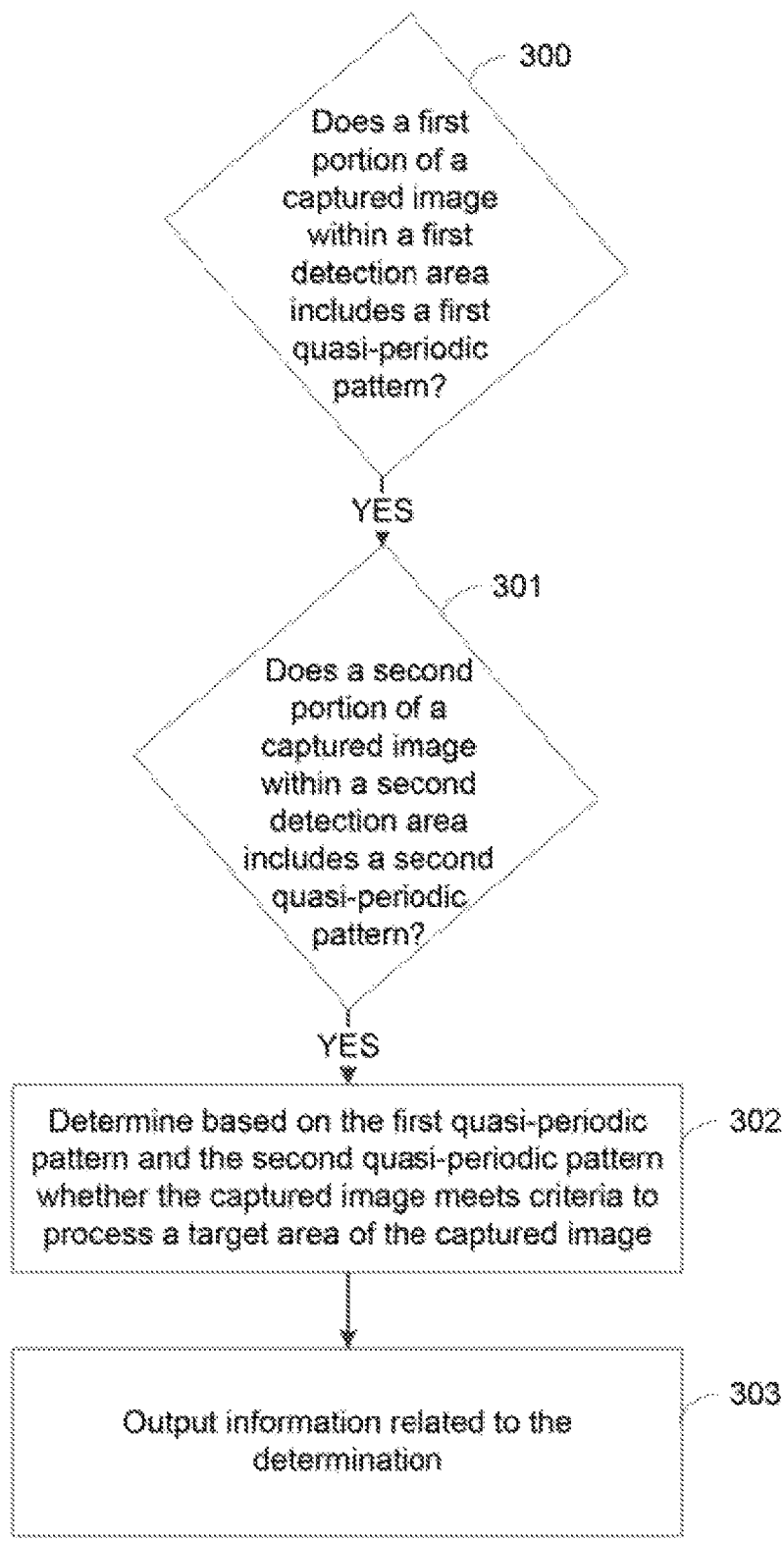
FIG. 3 is a block diagram illustrating one example of a method to determine image capture position information based on a quasi-periodic pattern.

FIG. 3 is a flow chart illustrating one example of a method to determine image capture information based on a quasi-periodic pattern. For example, a processor may detect whether a quasi-periodic pattern is present within a detection area, and determine whether a captured image meets image capture criteria based on the detection. The quasi-periodic pattern may be used as a reference point for position information within the image, such as where the quasi-periodic pattern borders a target area. The method may be implemented, for example, by the computing system 100 of FIG. 1.

Beginning at 300, a processor determines whether a first portion of a captured image within a first detection area includes a first quasi-periodic pattern. The first detection area may be in any suitable position. The detection area, may move dynamically or be in a static position. The detection area may be determined in any suitable manner. The detection area may be based on a position within a view finder. The position of the detection area may be based on the type of image being registered, such as based on the purpose or service associated with the image capture. The detection area may be any suitable shape for determining whether the contents within the area includes a quasi-periodic pattern.

There may be multiple detection areas such that a subset of a particular number or in particular positions detecting a quasi-periodic mark are used to determine that the image capture is sufficient. In one implementation, the processor decides where to place the detection areas and/or which detection areas to activate. The number, shape, size, and position of the detection areas may be updated.

If determined that a first portion of a captured image within a first detection area does not include a first quasi-periodic pattern, the processor may provide an indication, such as by making a detection area on a user interface appear a different color. The processor may not continue to process the target area if the first quasi-periodic pattern is not detected.

The quasi-periodic pattern may be any suitable quasi-periodic pattern, such as a halftone pattern. The processor may detect the quasi-periodic pattern in any suitable manner. In one implementation, the frequency of the pattern may be detected based on peak frequencies within a Discrete Frequency Transform (DFT) of the portion of the image within the detection area.

If the first detection area includes a quasi-periodic pattern, the processor at 301 determines whether a second portion of a captured image within a second detection area includes a second quasi-periodic pattern. The second detection area may be determined in any suitable manner. In one implementation, the position of the second detection area may be determined based on the position of a first detection area. The quasi-periodic pattern may be the same or different than the first quasi-periodic pattern. The first and second quasi-periodic patterns may be connected to one another and be part of the same pattern portion.

If determined that a second portion of a captured image within a second detection area does not include a second quasi-periodic pattern, the processor may provide an indication, such as by making the second detection area on a user interface appear a different color. The processor may not continue to process the target area if the second quasi-periodic pattern is not detected.

If the processor detects the first and second quasi-periodic pattern, at 302 the processor determines based on the first quasi-periodic pattern and the second quasi-periodic pattern whether the captured image meets criteria to process a target area of the captured image. For example, the criteria may be met based on detecting the first and second quasi-periodic patterns or based on the detection and analysis of additional characteristics. In one implementation, the processor further checks additional properties of the first and second quasi-periodic patterns to determine whether the image capture is sufficient. For example, the properties of the first and second quasi-periodic patterns may be compared. For example, the peak frequency information in a DFT associated with the first quasi-periodic pattern may be compared to the second quasi-periodic pattern to confirm that the difference is within a threshold range. In one implementation, the angle and/or scale of the first and second quasi-periodic patterns may be compared to determine that the patterns are associated with each other, the capture resolution, and/or the capture orientation.

At 303, the processor outputs information related to the determination. For example, if the criteria is met, the processor may store or transmit the image for processing and/or process the target portion of the image. Processing may involve extracting the target portion of the image from the quasi-periodic pattern information.

Figure 4:
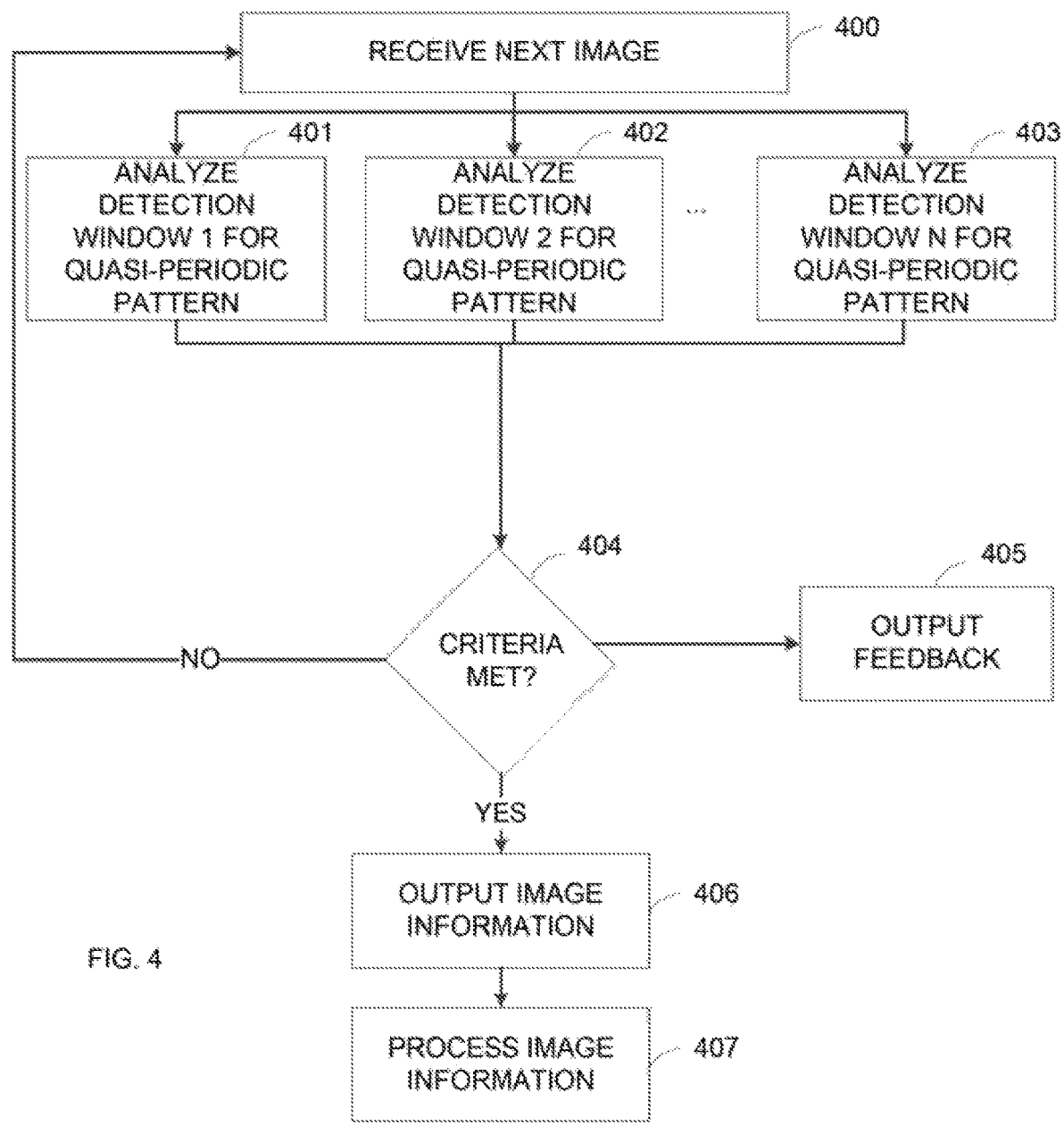
FIG. 4 is a flow chart illustrating one example of a method to process an image based on the presence of a quasi-periodic pattern.

FIG. 4 is a flow chart illustrating one example of a method to process an image based on the presence of a quasi-periodic pattern. For example, a user may capture still and/or video images, and a processor may analyze the images to determine if they sufficiently include a target object based on the presence of a quasi-periodic border. The processor may store the image for processing when it is determined that the target object is sufficiently within the captured image. In some implementations, the processor may determine information about the capture angle and resolution based on the quasi-periodic border, and the capture angle and resolution information may be used to determine whether to store the image for processing. The processor may provide additional information to a user to indicate whether the image is ready for processing and/or how to alter the image capture to improve the image for processing. The method may be implemented, for example by the computing system 100.

At 400, a next image is received. For example, the image may be received from an image capture device associated with a mobile device, such as a mobile phone. The image may be a video or still image. In one implementation, the user may continue to move the camera in relation to an object until a processor determines based on the presence of a quasi-periodic pattern that the captured image sufficiently captures the target area of the object. For example, each video frame may be considered to be the next image.

At 401-403, a processor associated with the device and/or a server for providing a service to the device may analyze the contents of the received image in the detection areas 1-N to determine if they include quasi-periodic patterns. In one implementation, the analysis of a detection area depends on the results of the analysis from a previously analyzed detection area. For example, a second detection area may not be checked if a first detection area failed.

At 404, the processor determines if image position criteria is met. The detection areas may be evaluated together or one at a time. In one implementation, multiple detection areas are analyzed where the processor determines that the criteria is not met if a particular number or set of detection areas do not include a quasi-periodic pattern. In one implementation, more or different detection areas are analyzed depending on which detection areas are determined to include a quasi-periodic pattern. In some cases, the processor may be able to detect the quasi-periodic pattern where the entire detection window does not include the pattern.

In one implementation, the processor analyzes criteria in addition to the existence of the quasi-periodic patterns, such as properties associated with the quasi-periodic patterns. For example, the scale and angle associated with the quasi-periodic pattern may be used to determine the orientation of the image capture to determine if it is in an acceptable range. In one implementation, the processor compares information about different portions of the quasi-periodic pattern. For example, the processor may determine that a quasi-periodic pattern is not associated, with the border, such as where the scale is outside a range of difference as compared to other portions of the quasi-periodic pattern.

At 405, the processor outputs feedback based on the determination of whether the criteria is met. For example, the processor may cause a user interface to be displayed that makes the detection areas visible, and detection areas that met the criteria may be displayed differently, such as with a different color outline, than those that did not meet the criteria. The processor may determine feedback related to how to change the camera capture. For example, an audio or visual cue may be provided to indicate that the image should be taken with the camera farther from the camera. The user interface may provide feedback related to the image capture, such as information about how to move the camera from side to side, to rotate it, or to move the camera closer or farther from the object. If the criteria was not met, the processor evaluates the next image, such as the next camera photo capture or video frame.

At 406, the processor outputs image information if the criteria was met. For example, the analyzed image may be stored or a second image may be captured and stored. The stored image may be stored on the device capturing the image and/or the device to process the image. In one implementation, a user captures a video image and moves the camera around until receiving positive feedback at which point the particular video frame is stored.

At 407, the processor processes the image information. Processing the image may involve processing the image at different levels, such as the image as a whole and/or the target portion. In one implementation, processing the image may involve an alignment and recovery method for separating a quasi-periodic border from a target portion of the image. For example, alignment and recovery of the target area may be performed based on information from the quasi-periodic pattern. The processor may analyze the quasi-periodic pattern in portions in addition to the detection areas to align and recover the target area, such as the entire quasi-periodic pattern within the image. The processor may perform an alignment and recovery method and output a quasi-periodic image and a target portion image.

In one implementation, the processor performs further processing on the quasi-periodic image. For example, the processor may determine whether there is a data payload associated with the quasi-periodic pattern, and if so, may recover the data payload or transmit the image for payload recovery. The characteristics of the payload may then, in turn, indicate information related to further processing.

In one implementation, the processor performs further processing on the target image. For example, the target image may be rotated or otherwise enhanced.

In one implementation, the target image is transmitted to another processor for providing a service related to the target image. The quasi-periodic image may also be transmitted and/or the information from the data payload of the quasi-periodic image may also be transmitted.

Figure 5:
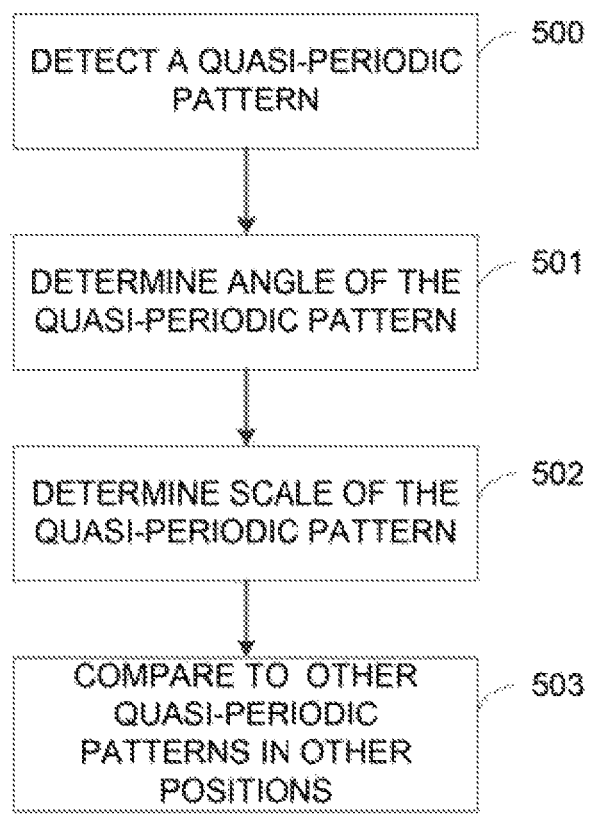
FIG. 5 is a flow chart illustrating one example of a method to evaluate an area of an image within a detection area based on quasi-periodic pattern.

FIG. 5 is a flow chart illustrating one example of a method to evaluate an area of an image within a detection area. For example, information about a border of a target area of an image may be evaluated to determine if an image capture is ready for processing. Any suitable properties of the quasi-periodic pattern may be used to determine information about the image capture. For example, the average number or position of dots in a halftone image may be analyzed and/or compared to other portions of the image.

Beginning at 500, a processor determines whether the portion of an image within a detection area includes a quasi-periodic pattern. For example, a Discrete Fourier Transform (DFT) of the image portion with the detection area may be created and analyzed for peak frequency points. If the portion includes a quasi-periodic pattern, further analysis is performed.

Continuing to 501, a processor determines an angle associated with the quasi-periodic pattern. An angle associated with the quasi-periodic pattern may be used to determine an orientation of the captured image. For example, the pattern may be created with a particular orientation such that a 90 degree angle indicates a horizontal capture versus a vertical capture. For a halftone image, the angle or orientation may be determined by comparing peak points in a DFT of the halftone image. The angle may be used to determine if the image was taken from a horizontal or vertical angle so that the orientation of the target area may be determined.

Continuing to 502, the processor determines a scale associated with the quasi-periodic pattern. The scale of the pattern may be used to determine information about the capture resolution. For example, a scale outside of a particular range, but indicate a capture resolution that would result in the image being unable to be processed. For a halftone image quasi-periodic pattern, the scale may be determined by the number of samples per cell. An x and y scale may be determined and used to estimate the capture resolution.

Continuing to 503, the processor compares properties of quasi-periodic patterns in multiple detection areas. For example, the scale of quasi-periodic patterns in multiple detection areas may be compared, such as to determine whether the amount of difference is within a particular range. A range outside of a threshold may indicate an oblique camera angle or possible a pattern being registered as a quasi-periodic pattern that is not part of the quasi-periodic pattern border. In one implementation, the angle of multiple quasi-periodic patterns may be compared. Angles outside of a particular threshold range may indicate that one of the quasi-periodic patterns is not associated with the same pattern and is not part of the quasi-periodic border. In one implementation, data payloads associated with quasi-periodic patterns may be compared. Differences between the payloads and/or estimated numbers of errors associated with the payloads may indicate that one of the quasi-periodic patterns is not associated with the same pattern and is not associated with the quasi-periodic border. Detecting and analyzing quasi-periodic patterns within detection areas may result in a more aesthetically pleasing manner of providing image capture information and guidance.

The invention claimed is:

1. A computer readable non-transitory storage medium comprising instructions executable by a processor for:
   determining, by the processor, whether a first portion of a captured image positioned within a first detection area includes a first quasi-periodic pattern;
   determining whether a second portion of the captured image positioned within a second detection area includes a second quasi-periodic pattern;
   determining based on the first quasi-periodic pattern and the second quasi-periodic pattern whether the captured image meets criteria to process a target area of the captured image, wherein the first and second detection areas are separate from the target area of the captured image;
   outputting information related to the determination; and
   in response to a determination that the target area is positioned within the captured image, processing the target area based on the output information including decoding a data payload from a pattern of the target area.

2. The storage medium of claim 1, further comprising instructions for providing feedback directing adjustment of a camera used for image capture of the captured image based on at least one of the presence or absence of either quasi-periodic pattern.

3. The storage medium of claim 1, wherein the captured image is received from a mobile device and is transmitted to a computing device for providing a service associated with the target area of the image.

4. The storage medium of claim 1, further comprising instructions for determining at least one of the orientation and resolution of the captured image based on either quasi-periodic pattern.

5. The storage medium of claim 1, further comprising instructions for analyzing the first and second quasi-periodic patterns to determine properties of the image capture of the image.

6. The storage medium of claim 5, wherein analyzing the first and second quasi periodic patterns comprise comparing a property of the first quasi-periodic pattern to a property of the second quasi-periodic pattern.

7. The storage medium of claim 5, herein analyzing the first and second quasi-periodic patterns comprises analyzing scale of the first and second quasi-periodic patterns to determine resolution of the captured image.

8. The storage medium of claim 1, further comprising instructions for determining at least one of: the number of detection areas, the position of the detection areas, and the shape of the detection areas.

9. The storage medium of claim 1, further comprising instructions for decoding a payload associated with the first and second quasi-periodic pattern.

10. The storage medium of claim 1, further comprising instructions for:
causing a user interface to be displayed overlaying an image being captured;
outputting an indication on the user interface related to the detection of at least one of the first and second quasi-periodic patterns.

11. The storage medium of claim 1, further comprising instructions for providing feedback directing adjustment of a camera used for the image capture based on detection of either of the first and second quasi-periodic patterns.

12. The storage medium of claim 1, further comprising instructions for providing feedback directing adjustment of a camera used for the image capture based on at least one of the angle and scale of the first quasi-periodic pattern.

13. The storage medium of claim 10, wherein outputting the indication comprises creating a visual indication such that a detection area including a quasi-periodic pattern appears differently than a detection area not including a quasi-periodic pattern.

14. A computer readable non-transitory storage medium comprising instructions executable by a processor for:
determining, by the processor, whether a target area is positioned within a captured image based on the detection of a quasi-periodic pattern in a first detection area and in a second detection area of the captured image, wherein the first and second detection areas are separate from the target area of the captured image;
outputting information, by the processor, for processing the target area when it is determined that the target area is positioned within the captured image and that capture image meets a set of criteria based on analysis of both the first and the second quasi-periodic pattern from the first and second detection areas; and in response to a determination that the target area is positioned within the captured image, processing the target area, based on the output information including decoding a data pay bad from a pattern of the target area.

15. The storage medium of claim 14, wherein either quasi-periodic pattern is a halftone pattern composed of black and white dots.

16. The storage medium of claim 15, where the quasi-periodic pattern comprises a steganographic halftone with a data payload encoded in the positioning of dots within the pattern.

17. A computer readable non-transitory storage medium comprising instructions executable by a processor for:
determining, by the processor, whether a first portion of a captured image positioned within a first detection area includes a first quasi-periodic pattern comprising a halftone pattern composed of dots;
determining based on the first quasi-periodic pattern whether the captured image meets criteria to process a target area of the captured image that is separate from the first portion bearing the first quasi-periodic pattern; and
processing the target area when it is determined that the captured image meets the criteria based on analysis of the first quasi-periodic pattern, including decoding a data payload from a pattern of the target area.

18. The storage medium of claim 17, wherein the first quasi-periodic pattern comprises a data payload encoded in positioning of the dots of the halftone pattern.

19. A computing system, comprising:
the storage medium of claim 17; and
a processor in communication with the storage medium to:
determine whether a target area is positioned within a captured image based on the detection of the first quasi-periodic pattern in the first detection area; and
output information for processing the target area when it is determined that the target area is positioned within the captured image and the captured image meets the criteria.

20. The computing system of claim 19, wherein the processor is further to determine a payload associated with the quasi-periodic pattern.

* * * * *

UNITED STATES PATENT AND TRADEMARK OFFICE
CERTIFICATE OF CORRECTION

PATENT NO. : 10,521,931 B2
APPLICATION NO. : 15/522749
DATED : December 31, 2019
INVENTOR(S) : Robert Ulichney et al.

Page 1 of 1

It is certified that error appears in the above-identified patent and that said Letters Patent is hereby corrected as shown below:

In the Claims

In Column 9, Line 13, Claim 7, delete "herein" and insert -- wherein --, therefor.

In Column 10, Line 5, Claim 14, delete "pattern" and insert -- patterns --, therefor.

In Column 10, Lines 9-10, Claim 14, delete "pay bad" and insert -- payload --, therefor.

Signed and Sealed this
Seventh Day of April, 2020

Andrei Iancu
*Director of the United States Patent and Trademark Office*